United States Patent [19]
Johannsen

[11] Patent Number: 6,056,252
[45] Date of Patent: May 2, 2000

[54] SUPPORT ASSEMBLY FOR TELESCOPIC CONVEYOR SYSTEM

[75] Inventor: Thorkil J. Johannsen, Oakville, Canada

[73] Assignee: Thor Steel & Welding Ltd., Mississauga, Canada

[21] Appl. No.: 08/979,362

[22] Filed: Nov. 26, 1997

[51] Int. Cl.[7] .................................................. F16M 11/24
[52] U.S. Cl. ...................... 248/188.3; 198/812; 212/350; 52/118
[58] Field of Search ..................................... 198/812, 313; 193/35 TE; 248/188.3; 212/350, 230, 264; 52/118

[56] References Cited

U.S. PATENT DOCUMENTS

| | | | |
|---|---|---|---|
| 2,938,614 | 5/1960 | Hewit | 193/35 TE |
| 3,093,248 | 6/1963 | Winter | 212/230 |
| 3,341,029 | 9/1967 | Barkley et al. | 212/350 |
| 3,378,125 | 4/1968 | Fogg . | |
| 3,552,546 | 1/1971 | Rath | 198/812 |
| 3,613,866 | 10/1971 | Arndt . | |
| 3,687,276 | 8/1972 | Pelletier . | |
| 3,722,477 | 3/1973 | Weldy et al. | 198/812 |
| 3,788,452 | 1/1974 | McWilliams . | |
| 3,825,107 | 7/1974 | Cary et al. . | |
| 3,874,136 | 4/1975 | Michel | 52/118 |
| 4,090,625 | 5/1978 | Walters | 212/264 |
| 4,406,361 | 9/1983 | Konigs et al. . | |
| 4,679,652 | 7/1987 | Cervantes | 248/188.3 |
| 5,351,809 | 10/1994 | Gilmore et al. . | |
| 5,487,462 | 1/1996 | Gilmore . | |
| 5,669,562 | 9/1997 | Smith . | |

*Primary Examiner*—Christopher P. Ellis
*Assistant Examiner*—Joe Dillon, Jr.
*Attorney, Agent, or Firm*—Barrigar & Moss

[57] ABSTRACT

A support assembly for supporting an extendable frame that is telescopically mounted on a base frame. The support assembly includes a number of support rollers for supporting the extendable frame. The support rollers are supported by lever devices such that the load applied by the extendable frame on the support rollers is proportionately distributed over all of the support rollers. The lever device includes a pivot plate device pivotally mounted to the base frame to pivot about a primary pivot axis. At least two support rollers are connected to the pivot plate to rotate about rotational axes located on opposite sides of the primary pivot axis. Also provided is a telescopic conveyor system having such a support assembly.

10 Claims, 4 Drawing Sheets

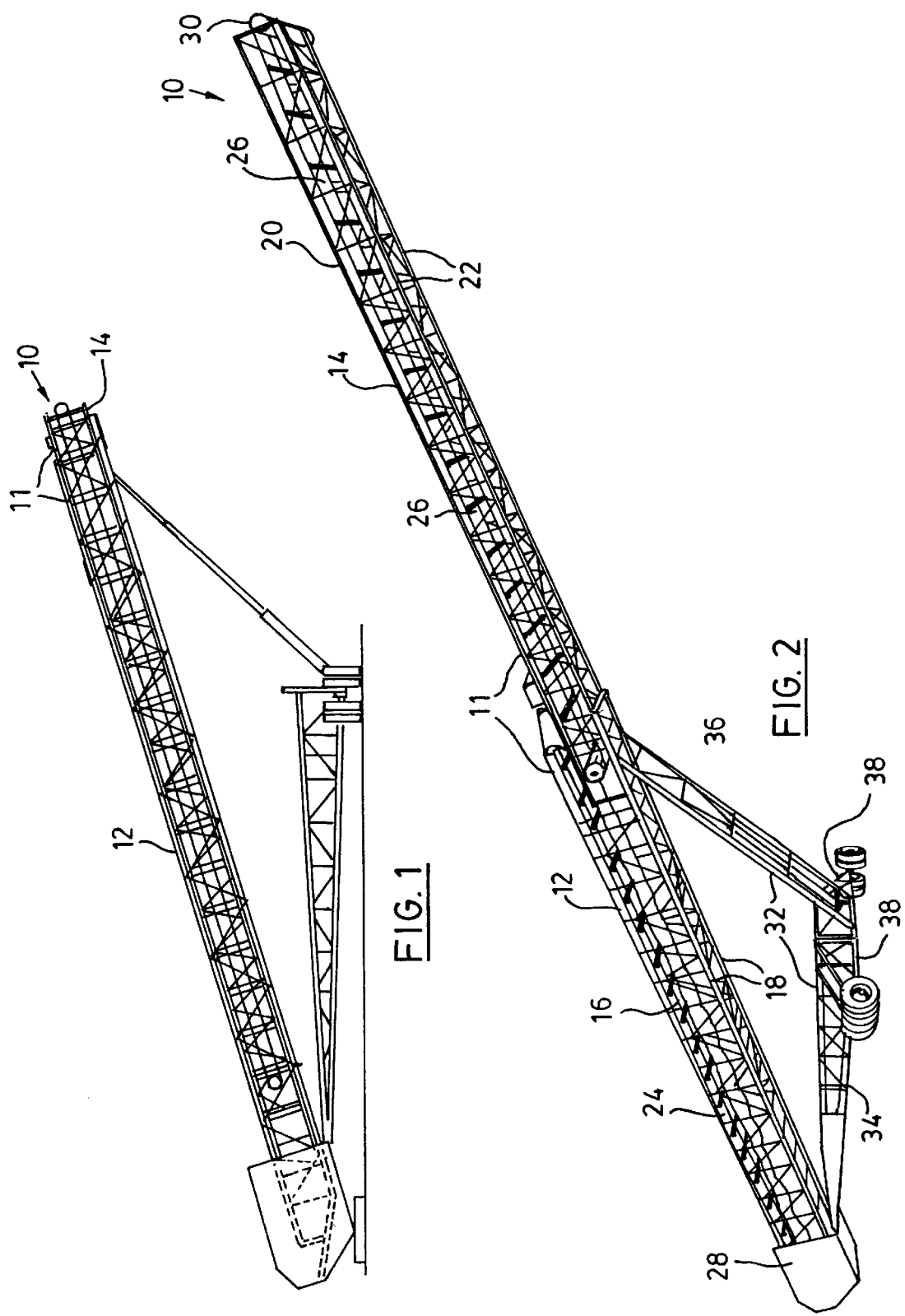

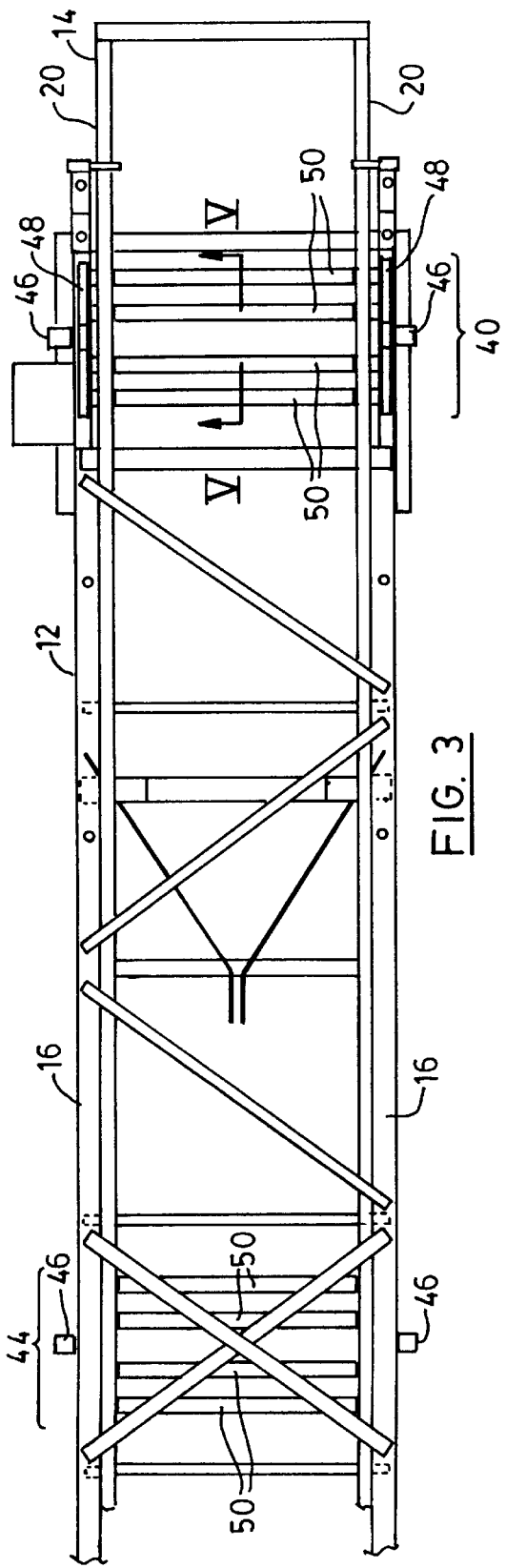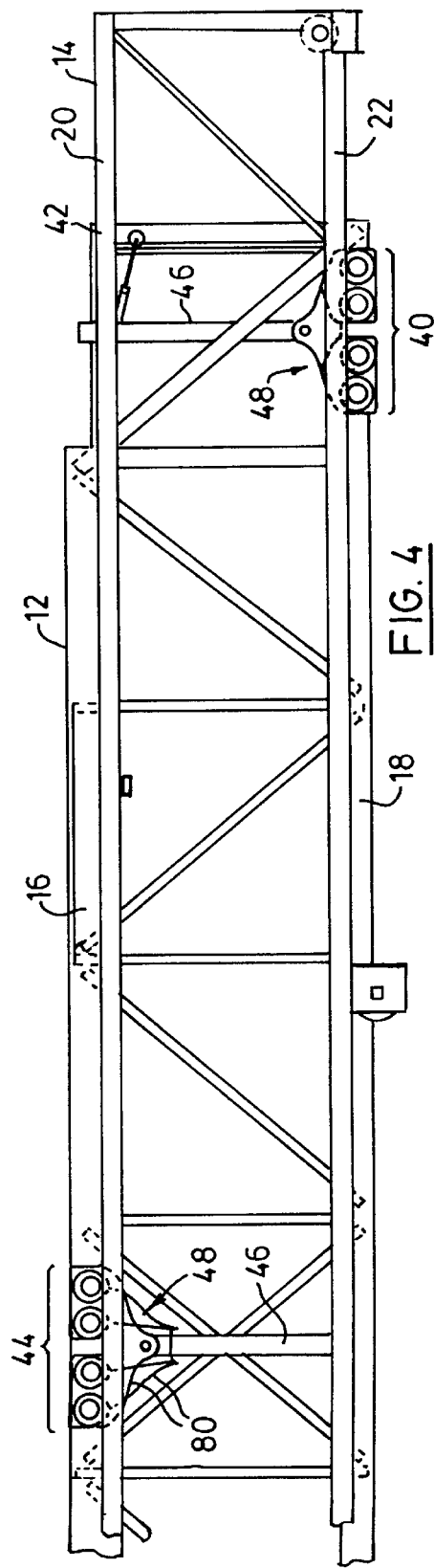

SUPPORT ASSEMBLY FOR TELESCOPIC CONVEYOR SYSTEM

BACKGROUND OF THE INVENTION

The present invention relates to telescopic conveyor systems, and in particular to support assemblies for telescopic conveyor systems.

Telescopic conveyor systems are commonly used to transport materials from one location to another location. Typically, telescopic conveyor systems have a frame which includes an elongate extendable frame mounted for reciprocal movement on an elongate base frame. Reciprocal movement of the extendable frame is usually facilitated by a number of rollers which are mounted directly on either the base frame or the extendable frame and which travel along guide tracks. Examples of extendable conveyor systems can be seen in U.S. Pat. No. 3,378,125 issued Apr. 16, 1968 to Fogg, U.S. Pat. No. 3,825,107 issued Jul. 23, 1974 to Cary et al., and U.S. Pat. No. 5,351,809 issued Oct. 4, 1994 to Gilmore et al.

In recent years, mobile telescopic conveyor belts have seen use in very heavy industries such as the aggregate industry where mobile conveyors are used to construct non-segregated stock piles of aggregate materials. Telescopic conveyor belts used in the aggregate industry are generally larger than those described in the above mentioned patents, and have an elongate base frame with a rectangular cross-section which telescopically receives an elongate extendable section having a smaller rectangular cross-section. By way of example, the Thor Aggregate Equipment Division of Thor Steel And Welding Ltd. of Mississauga, Ontario, Canada produces and sells a telescopic conveyor system for use in the aggregate industry known as a Telescopic Portable Radial Stacker which, in one version, has a retracted length of approximately 82.5 feet and an extended length of approximately 136 feet. In order to adequately support the extendable frame, a number of parallel, spaced support rollers are typically located at the bottom side of the outward end of the base frame for engaging the underside of the extendable frame, and a number of parallel, spaced support rollers are located at the top side of the base frame, some distance from the outward end of the base frame, for engaging the top-side of the extendable frame. In the past, these support rollers have all been mounted on the base frame independent of each other. Given the weight and size of the extendable frame, and the weight of the aggregate load it is used to transport, the extendable frame will typically deflect to a certain degree of curvature along its longitudinal axis when extended. The degree of curvature will vary depending on, among other things, the size of the conveyor system, the load carried, and the extent that the extendable frame is actually extended at any given time. As a result of this curvature, it has been difficult to provide adjacent support rollers which each bear a proportionate share of the weight of the extendable frame. For example, when the extendable frame is in its fully extended position, its curvature could result in the support roller located closest to the outward end of the base frame bearing substantially the entire weight of the extendable frame while an adjacent support roller was subjected to a disproportionately lighter load. As a result disproportionate stresses are concentrated on one support roller, and on the location of the extendable frame that is engaged by the support roller. Such a configuration requires that stronger and more materials be used in the construction of the conveyor frame to compensate for these disproportionate stresses, and additionally may reduce the lifespan of the support rollers.

It is therefore desirable to provide a support assembly for a telescopic frame which provides for a proportional distribution of weight across a number of adjacent support rollers regardless of the curvature of the extendable frame. It is also desirable to provide a telescopic conveyor belt system which has such a support assembly.

BRIEF SUMMARY OF INVENTION

According to one aspect of the invention there is provided a support assembly for a telescopic frame having an elongate base frame and an elongate extendable frame reciprocally movable in a longitudinal direction along the base frame, the support assembly being connectible to the base frame for supporting at least a portion of said extendable frame. The support assembly includes a pivot plate device connected to the base frame to pivot about a primary pivot axis that is substantially transverse to the longitudinal axes of the base frame and the extendable frame, and first and second bearing plates mounted on the pivot plate device to pivot about a first pivot axis and a second pivot axis respectively. The first pivot axis and the second pivot axis are located on opposite sides of the primary pivot axis such that the pivot plate device functions as a first class lever. The support assembly also includes at least two support rollers, one of the support rollers being rotatably mounted to the first bearing plate, and another of the support rollers being rotatably mounted to the second bearing plate. The support rollers are located to engage the extendable frame such that the extendable frame rolls along the support rollers when the extendable frame is moved along the base frame.

Preferably, the support assembly includes at least three support rollers, two of the support rollers being rotatably mounted to the first bearing plate for rotation about axes that are located on opposite sides of the first pivot axis. The support rollers are preferably in parallel alignment with each other and extend transversely across at least a portion of the base frame.

The support assembly can include four support rollers, two of the support rollers being rotatably mounted to the first bearing plate for rotation about axes that are located on opposite sides of the first pivot axis, and two of the support rollers being rotatably mounted to the second bearing plate for rotation about axes that are located on opposite sides of the second pivot axis.

According to a further aspect of the invention, there is provided a telescopic frame having an elongate base frame and an elongate extendable frame reciprocally movable in a longitudinal direction along the base frame. A support assembly is connected to the base frame for supporting at least a portion of the extendable frame. The support assembly includes a pair of spaced apart lever devices pivotally mounted on the base frame to pivot about substantially aligned primary pivot axes that are substantially transverse to the longitudinal axes of the base frame and the extendable frame. Two spaced apart support rollers are rotatably connected to and extend between the lever devices. The support rollers have rotational axes that are located on opposite sides of the primary pivot axes, and the support rollers extend across at least a portion of the base frame such that the extendable frame rolls along the support rollers when the extendable frame is moved along the base frame.

Preferably, each lever device includes a pivot plate device pivotally mounted on the base frame to pivot about the primary pivot axis, and first and second bearing plates mounted on the pivot plate device to pivot about a plates mounted on the pivot plate device to pivot about a first pivot axis and a second pivot axis respectively, the first pivot axis and the second pivot axis being located on opposite sides of the primary pivot axis. One of the support rollers is pivotally connected between the first bearing plates of the lever devices and the other of the support rollers is pivotally connected between the second bearing plates of the lever devices.

The support assembly can include a further support roller mounted between the first bearing plates to rotate about a rotational axis such that the extendable frame also rolls along the further support roller when the extendable frame is moved along the base frame, the rotational axes of the two support rollers mounted between the first bearing plates being located on opposite sides of the first pivot axis.

According to still a further aspect of the invention there is provided a telescopic conveyor system including an elongate base frame, an elongate extendable frame mounted to the base frame for longitudinal reciprocal movement relative to the base frame between a retracted position and an extended position, conveyor means mounted to the base frame and the extendable frame for moving a load along the base frame and the extendable frame, and a support assembly connected to the base frame for supporting a portion of the extendable frame. The support assembly includes a lever device mounted to the base frame so as to pivot about a primary pivot axis, and two spaced apart support rollers connected to the lever device to rotate about axes which are located on opposite sides of the pivot axis. The support rollers are located to engage the extendable frame such that the extendable frame rolls along the support rollers when the extendable frame is moved along the base frame between its retracted and extended positions.

Preferably, the lever device includes a pivot plate device pivotally mounted on the base frame to pivot about the primary pivot axis, and first and second bearing plates mounted on the pivot plate device to pivot about a first pivot axis and a second pivot axis respectively, the first pivot axis and the second pivot axis being located on opposite sides of the primary pivot axis. One of the support rollers is rotatably connected to the first bearing plate and the other support roller is rotatably connected to the second bearing plate. The telescopic conveyor system can include a further support roller connected to the first bearing plate to rotate about a rotational axis such that the extendable frame also rolls along the further support roller when the extendable frame is moved along the base frame, the rotational axes of the two support rollers mounted to the first bearing plate being located on opposite sides of the first pivot axis.

BRIEF DESCRIPTION OF DRAWINGS

A detailed description of the preferred embodiments is provided below with reference to the following drawings, in which:

FIG. 1, in a side view, illustrates a telescopic conveyor belt system in accordance with a preferred embodiment of the present invention, with the extendable frame of the conveyor belt system in a retracted position;

FIG. 2, in a perspective view, illustrates the telescopic conveyor belt system of FIG. 1 with the extendable frame in an extended position:

FIG. 3 illustrates a partial top view of the telescopic conveyor belt system of FIG. 1;

FIG. 4 illustrates a side sectional view of a portion of the telescopic conveyor belt system of FIG. 1;

DETAILED DESCRIPTION OF PREFERRED EMBODIMENTS

Figure 5:
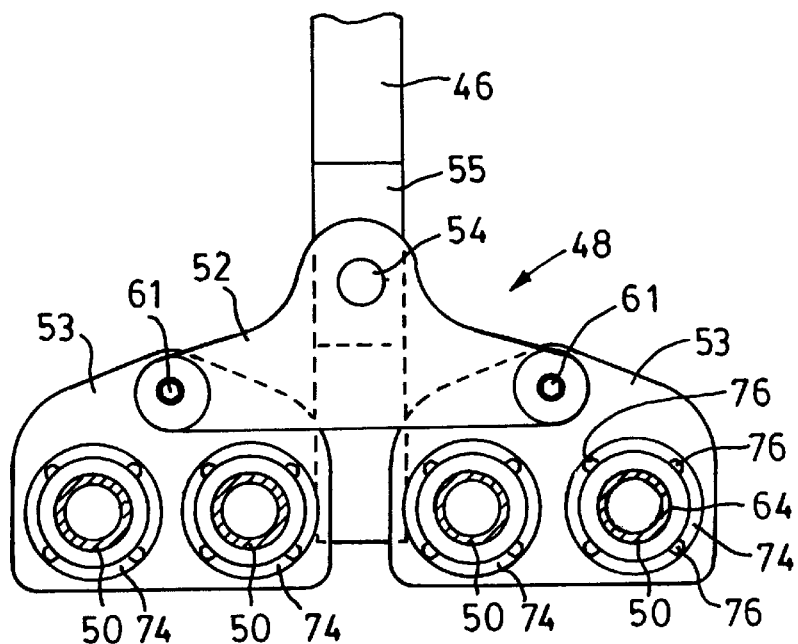
FIG. 5 is a partial cross-sectional view of a support assembly for the telescopic conveyor system, taken along the lines V—V of FIG. 3.

Referring to FIGS. 1 and 2, a telescopic conveyor belt system, indicated generally by 10, is shown in accordance with a preferred embodiment of the present invention. The conveyor belt system 10 includes a telescopic frame 11 which has an elongate base frame 12 and an elongate extendable frame 14. Both the base frame 12 and the extendable frame 14 have a generally rectangular cross-section, with the cross-section of the extendable frame 14 being smaller than the cross-section of the base frame 12 so that the extendable frame 14 can be received within the base frame 12. The extendable frame 14 is telescopically mounted for reciprocal movement in and out of the base frame 12. FIG. 1 illustrates the conveyor belt system 10 with the extendable frame 14 in a retracted position and FIG. 2 illustrates the conveyor belt system 10 with the extendable frame 14 in a fully extended position.

The base frame 12 and extendable frame 14 each include a pair of elongate upper support rails 16 and 20, respectively, and a pair of elongate lower support rails 18 and 22, respectively. The upper support rails 16 and the lower support rails 18 of the base frame 12 are interconnected in a conventional manner by a number of brace members, and the upper support rails 20 and the lower support rails 22 of the extendable frame 16 are also connected together by a number of brace members. It will be appreciated by those skilled in the art that the use of support rails which are interconnected by braces is conventionally used in large scale telescopic frame structures in order to maximize the strength of the frame while minimizing its weight.

The conveyor belt system 10 includes a first conveyor belt 24, which is mounted on the base frame 12, and a second conveyor belt 26, which is mounted on the extendable frame 14. As best seen in FIG. 2, the first conveyor belt 24 is mounted such that its load carrying surface is located above upper support rails 16 of the base frame 12, and the second conveyor belt 26 is mounted such that its load carrying surface is located below the upper support rails 20 of the extendable frame 14. This configuration provides the necessary clearance for retracting the extendible frame 14 within the base frame 12. Conveyor belts 24 and 26 are mounted on their respective frames for movement in a conventional manner, and when in operation serve to move a load such as aggregate from a feed end 28 of the conveyor system (located at the lower end of the base frame 12) to a discharge end 30 of the conveyor system (located at an upper end of the extendable frame 14).

The conveyor belt system 10 makes use of an actuator means known in the art for extending and retracting the extendable section 14.

The telescopic frame 11 of the conveyor belt system 10 is preferably mounted on a support frame 32, such that telescopic frame 11 can be raised and lowered and also transported from place to place. Support frame 32 includes a horizontal frame 34, to which the base frame 12 is pivotally mounted in the vicinity of its feed end 28. A hydraulic lift frame 36 is provided for elevating and lowering the telescopic frame 11. The support frame 32 preferably includes wheel assemblies 38 which can be rotated about the horizontal frame 34 between a use position as shown in FIGS. 1 and 2, and a transport position (not shown). In the use position, the wheel assemblies 38 extent substantially transversely from the longitudinal axis of the telescopic frame 11 and allow the conveyor belt system 10 to be radially rotated about its feed end 28. In the transport position, the wheel assemblies 38 extend parallel to the longitudinal axis of the telescopic frame 11, and permit the conveyor belt systems 10 to be towed from place to place (preferably with the extendable frame 14 in a fully retracted position, and the telescopic frame 11 in a fully lowered position). Thus the conveyor belt system 10 is a portable, telescopic, radial conveyor belt system which can be used for a number of applications, including forming non-segregated piles of aggregate. Conveniently, the conveyor belt system 10 may also include wheels (not shown) located at its feed end 28 so that the system 10 can be moved in a lateral direction as well as longitudinally without having to raise the feed end 28 up off of its supports.

The present invention is particularly directed to the manner in which the extendable frame 14 is mounted for reciprocal movement along the base frame 12. With reference to FIGS. 3 and 4, the extendable frame 14 is supported by a first support assembly 40 located near the outer end 42 of the base frame from which the extendable frame 14 extends and retracts, and a second support assembly 44 located on the base frame 12 at a distance off-set from the outer end 42. The first support assembly 40 engages and supports the underside of the extendable frame 14, and the second support assembly 44 engages and supports the top side of the extendable frame 14.

The first support assembly 40 and the second support assembly 44 are substantially identical, with the primary difference between the two being that the second support assembly 44 is inverted relative to the first support assembly 40. Each of the support assemblies 40 and 44 are secured to the base frame 12 by a pair of spaced apart support members 46 which are rigidly secured to and are a part of the base frame 12. As seen in FIGS. 3 and 4, the support members 46 used to secure the first support assembly 40 extend upwardly along opposite sides of the base frame 12. Similarly, the support members 46 of the second support assembly 44 also extend upwardly on opposite sides of the base frame 12. Conveniently, the support members 46 may be constructed from 4" by 4" inch hollow rectangular tubing formed from steel having a ⅜" thickness, however the support members 46 could take a wide variety of other shapes and sizes.

With reference to the first support assembly 40, the construction of a support assembly in accordance with one preferred embodiment of the present invention will now be described in greater detail. The support assembly 40 includes two substantially identical lever devices, indicated generally by 48, which support four spaced preferably parallel support rollers 50 which extend transversely across the base frame 12 for supporting the extendable frame 14. The lever devices 48 are each pivotally mounted at opposite sides of the base frame 12 to a lower portion of one of the support members 46 of the first support assembly 40.

Figure 6:
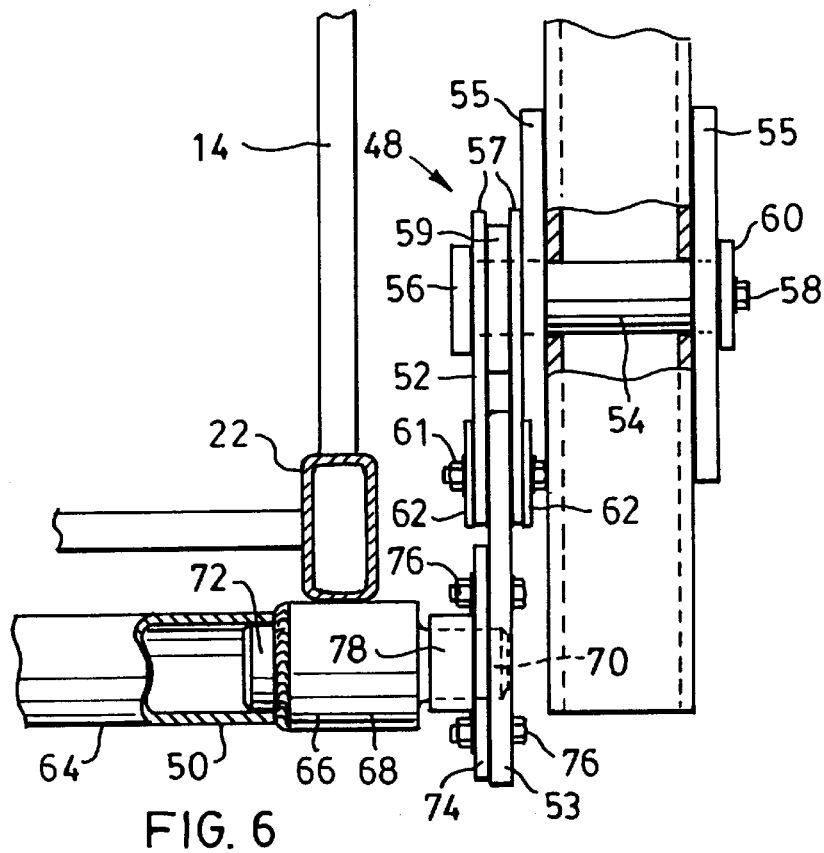
FIG. 6 is a sectional end view of the support assembly of FIG. 5.

With reference to FIGS. 5 and 6, one of the lever devices 48 of the first support assembly 40 will now be described in greater detail. Each lever device 48 includes a pivot plate device 52 which is pivotally mounted on the support member 46, and first and second bearing plates 53 which are each in turn pivotally mounted on the pivot plate 52. The bearing plates 53 each are adapted to support one end of two of the support rollers 50.

As best seen in FIG. 6, each pivot plate device 52 is preferably formed from two substantially identical parallel plates 57 which are spaced apart by a circular spacer 59 which has substantially the same thickness as the bearing plates 53. The pivot plate device 52 is mounted on the support member 46 by a pin 54, which extends through aligned holes provided in the plates 57, the spacer 59, and the support member 46. Preferably, rectangular flat bars 55 are rigidly secured to opposite sides of the support member 46 in the region where the pin 54 passes through in order to increase the strength of the support member 46. The pin 54 preferably has an enlarged circular head 56 at one end for engaging the pivot plate 52 device, and is threaded at its opposite end for receiving a bolt 58 on which is mounted a circular washer 60 which has an area larger than the cross-section of the hole through which the pin 54 extends. The shaft of the pin 54 preferably has an overall length slightly longer than the combined total thickness of the plates 57, the spacer 59, the flat bars 55, and the support member 46, in order to permit the pivot plate device 52 to pivot about a primary pivot plate pivot axis provided by pin 54.

An upper portion of each of the first and second bearing plates 53 extends between the two plates 57 of the pivot plate device 52, and each of the bearing plates 53 is pivotally mounted to plates 57 by a bolt 61 which extends through aligned holes provided through the plates 57 and the bearing plate 53 and serves as a pivot pin. The bolt 61 is preferably secured with a nut. Washers 62 are preferably located between each of the head and nut of the bolt 60 and the plates 57. In this manner, the first and second bearing plates 53 are each mounted on the pivot plate device 52 to pivot about a first bearing plate pivot axis and a second bearing plate pivot axis, respectively, the pivot axes being provided by the bolts 60. As best seen in FIG. 5, the bearing plates 53 are mounted on pivot plate device 52 such that the first bearing plate pivot axis and the second bearing plate pivot axis are located on opposite sides of the pivot axis of the pivot plate device 52. In this regard, the pivot plate device 52 acts as a first class lever with its pivot axis being the fulcrum, and the pivot axes of the first and second bearing plates 53 acting as load points. Conveniently, the first and second bearing plate pivot axes may be equidistant from the pivot plate pivot axis such that the degree of force applied to each of the bearing plates 53 by the pivot plate device 52 will be equal.

The two lever devices 48 of the first support assembly 40 are pivotally mounted to opposite sides of the base frame 12 in alignment with each other such that their respective primary pivot axis and first and second bearing plates pivot axes are substantially transverse to the longitudinal axes of the base frame 12 and extendable frame 13. Two support rollers 50 extend between and are pivotally mounted to the first bearing plates 53 of the two lever devices 48, and two support rollers 50 extend between and are pivotally mounted to the second bearing plates 53. As best seen in FIG. 5, the support rollers 50 are positioned such that the rotational axes of the two rollers mounted to a particular bearing plate 53 are located on opposite sides of the bearing plate pivot axis of that particular bearing plate. Thus, each bearing plate 53 is itself a first class lever, with its pivot axis serving as a central fulcrum located between the rotational axes of the two rollers 50 which are mounted thereon.

With reference to FIG. 6, the manner in which each support roller 50 is connected to a bearing plate will now be discussed. Each roller 50 preferably includes an elongate central hollow steel tube section 64 and has solid steel stub sections 66 located at both ends of the tube section 64. Each stub 66 includes a cylindrical load bearing portion 68 and a cylindrical connecting portion 70 which has a cross-section less than that of the load bearing portion 68. The stubs 66 may be connected to the end of the tube 64 by press fitting the stubs 66 into tube 64 and then welding the stubs to the tube. In order to facilitate a press fit connection each stub 66 is provided with fit stub 72.

The connecting portion 70 of each stub 66 is used to pivotally connect an end of the roller 50 to one of the bearing plates 53. Each bearing plate 53 includes two adjacent holes which are located on opposite sides of the bearing plate pivot axis, each for receiving the connecting portion 70 of one of the rollers 50. These holes in the bearing plate each preferably have a diameter which is somewhat larger than the diameter of the connecting portion 70 it will receive, and are each covered by pilot bearings 74 which are secured to the surface of the bearing plate 53 facing the roller 50. Each pilot bearing 74 has a hole formed therethrough which is dimensioned to accommodate the diameter of the connecting portion 70 of the stub 66. The pilot bearings 74 are each preferably secured to their respective bearing plates 53 by four bolts 76 (which can be secured by nuts, or be secured by tapped bores provided in the pilot bearing). A bushing 78 is provided on the connecting portion 70 of each of the rollers 50 for location between the load bearing section 68 and the pilot bearing 74 to limit lateral movement of the roller 50. Ball bearings or other means may be provided in the interface between the pilot bearing 74 of the bearing plate 53 and the connecting portion 70 in order to facilitate rotation of the rollers 50. The support rollers 50 of the first support assembly 40 are mounted such that the bottom surface of the lower support rails 22 of the extendable frame 14 engage the load bearing portions 66 of the rollers 50.

As previously mentioned, the second support assembly 44 is substantially identical to the first support assembly 40 except that it is inverted. In this regard, the load bearing portions 66 of the rollers 50 in the second support assembly 44 engage the top surface of the upper support rails 20 of the extendable frame 14. As can be seen with reference to the second support assembly 44 in FIG. 4, the support assemblies may be provided with grease line hoses 80 leading to the connecting portions 70 of stubs 66 in order to allow the rollers 50 to be easily greased.

In operation, the extendable frame 14 is extended and retracted by actuator means known in the art. As it extends and retracts, it travels along and is supported by rollers 50 of the first 40 and second 44 support assemblies. In particular the lower support rails 22 each ride along the four support rollers 50 of the first support assembly 40, and the upper support rails 20 each ride along the four support rollers 50 of the second 44 support assembly as the extendable frame 14 is moved between its extended and retracted positions. The first 40 and second 44 support assemblies act as the interface between the extendable frame 14 and the base frame 12. As mentioned above, the degree of curvature of the extendable frame 14 along its longitudinal axis will vary depending on location of the extendable frame 14 relative to the base frame 12, and also on a load applied to the extendable frame 14. Because of the pivotal nature of the support assemblies 40 and 44 of the present invention, they automatically adjust to the changes in curvature of the extendable frame 14 that occur, thus ensuring that the force applied by the extendable frame 14 on the first support assembly 40 is proportionately distributed across all four rollers 50 of the assembly 40, and similarly that the force applied by the extendable frame 14 on the second support assembly 44 is proportionately distributed across all four rollers of the assembly 44. Thus, no single roller 50 is subjected to bearing a disproportionate amount of weight, and additionally, the extendable frame 14 is not subjected to a disproportionate amount of force in the vicinity of just one roller. Where the support assemblies 40 are each constructed in a bisymmetrical manner, (i.e., the rollers 50 are each located the same perpendicular distance from the pivot axis of the bearing plates they are secured to, and the pivot axes of the first and second bearing plates are equally spaced relative to the primary pivot axis of the pivot plate device), then the load applied the rollers 50 within a support assembly will substantially be equally distributed across each of the rollers regardless of any curvature experienced by the extendable frame 14. As a result of the improved distribution of force, at least some of the rollers 50 are subjected to less stress and may have a longer life span than if they were mounted independently of each other on the base frame 12. Additionally, as no single section of the extendable frame 14 is subjected to a disproportionate amount of force by a single support roller, the extendable frame 14 can be constructed from lighter or lower yield strength materials than if independently supported rollers were used.

In the preferred embodiment illustrated, the bearing plates 53 and flat bars 55 are preferably formed from steel plate having a thickness of ⅝", and the plates 57 are formed from steel plates having a thickness of ⅜. It will of course be appreciated that different materials having different thicknesses could be used as appropriate.

It will be appreciated that the support assemblies 40 and 44 could be constructed in other ways then described above. For example, the pivot plate device 52 may comprise only a single plate 57, rather than two plates 57. Furthermore, although each lever device 48 is used to support four rollers 50, depending upon the size of the telescopic frame, lever devices which support more or less than four rollers could be used.

Figure 7:
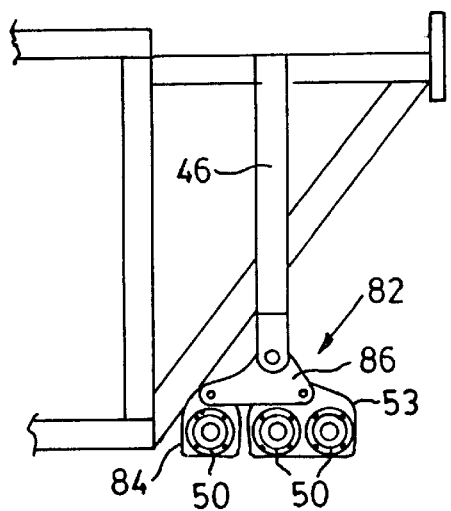
FIG. 7 illustrates a support assembly in accordance with a further preferred embodiment of the present invention.

In this respect, FIG. 7 illustrates a support assembly having a lever device 82 constructed in accordance with a second preferred embodiment of the invention. The lever device 82 is similar to the lever device 48, except as hereafter noted. The lever device 82 supports only three rollers 50, and would be suitable for use in smaller telescopic frames. Two of the rollers are supported by one bearing plate 53, and one roller is supported by another bearing plate 84. The bearing plates 53 and 84 are each pivotally mounted on a pivot plate device 86, which is in turn pivotally mounted on support member 46. The lever device 82 functions similar to lever device 48 to ensure that all rollers 50 remain in contact with the extendable frame 14 regardless of the curvature of the frame 14. In applications where it is desirable that all the rollers 50 be subjected to substantially the same degree of force, the perpendicular distance from the pivot axis of the bearing plate 84 to the pivot axis of the pivot plate device 86 is twice that of perpendicular device from the pivot plate device pivot axis to the pivot axis of the bearing plate 53, and the rollers 50 connect to plate 53 are equally spaced on opposite sides of the pivot axis of the plate 53.

Figure 8:
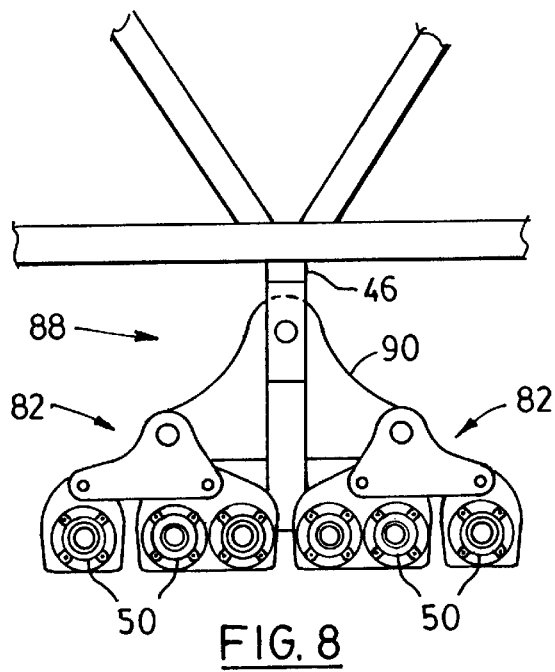
FIG. 8 illustrates a support assembly in accordance with a further preferred embodiment of the present invention.
Figure 9:
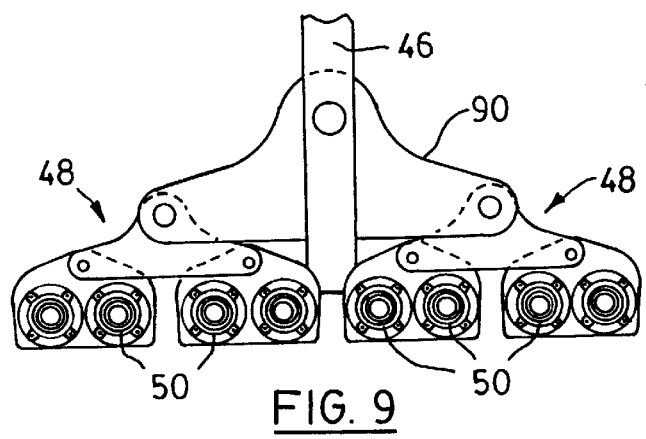
FIG. 9 illustrates a support assembly in accordance with still a further preferred embodiment of the present invention.

It will be appreciated that a number of support assembles as described above could be combined together to provide larger support assemblies for larger telescopic frames. For example, FIG. 8 illustrates a further support assembly 88 which includes two lever devices 82 pivotally mounted on opposite ends of a main pivot plate 90 which is pivotally mounted on support member 46. FIG. 9 illustrates still a further support assembly which includes two lever devices 48 pivotally mounted on opposite ends of main pivot plate 90, which is in turn pivotally mounted on support member 46.

Thus, it will be appreciated that the support assembly of the present invention could be implemented using a number of different configurations. By way of further example, in some applications it may be sufficient to attach only a single support roller to the first and second bearing plates 53 of the support assemblies 40 and 44. In other applications, it may be possible to attach the rollers directly to the pivot plate without any intervening bearing plates.

As described above, each support assembly 40 or 44, includes two lever devices located opposite each other to support opposite ends of a support roller. However in some applications it may not be necessary that the support rollers extend between the two load supporting devices, but rather that each lever device independently support rollers that are not connected to another lever device, and accordingly in such devices a support assembly could includes just a single lever device.

Although the above description has focused on the use of the support assembly in the context of a telescopic frame for a conveyor belt assembly, it will be appreciated that the support assembly could be used with telescopic frames used for other purposes.

While various embodiments of this invention have been illustrated in the accompanying drawings and described above, it will be evident to those skilled in the art that changes and modifications may be made therein without departing from the essence of this invention. All such modifications and variations are believed to be within the sphere and scope of the invention as defined by the claims appended hereto.

What is claimed is:

1. A support assembly for a telescopic frame having an elongate base frame and an elongate extendable frame reciprocally movable in a longitudinal direction along the base frame, the support assembly being connected to the base frame for supporting at least a portion of said extendable frame and comprising:

a pivot plate device pivotally connected to said base frame for pivoting about a primary pivot axis that is substantially transverse to the longitudinal axes of the base frame and the extendable frame;

first and second bearing plates pivotally mounted on said pivot plate device for pivoting about a first pivot axis and a second pivot axis respectively, said first pivot axis and said second pivot axis being located on opposite sides of said primary pivot axis such that said pivot plate device functions as a first class lever responsive to forces applied thereon by said bearing plates; and at least two support rollers, one of said support rollers being rotatably mounted to said first bearing plate and another of said support rollers being rotatably mounted to said second bearing plate, said support rollers engaging said extendable frame such that the extendable frame rolls along said support rollers when the extendable frame is moved along the base frame.

2. A support assembly according to claim 1 wherein said support assembly includes a further support roller rotatably mounted to said first bearing plate and engaging said extendable frame, the two support rollers mounted to said first bearing plate having rotational axes located on opposite sides of said first pivot axis.

3. A support assembly according to claim 2 wherein said support rollers are in parallel alignment with each other and extend transversely across at least a portion of said base frame.

4. A support assembly according to claim 2 wherein said support assembly includes an additional support roller rotatable mounted to said second bearing plate and engaging said extendible frame, the two support rollers mounted to said second bearing plate having rotational axes located on opposite sides of said second pivot axis.

5. A support assembly for a telescopic frame having an elongate base frame and an elongate extendable frame reciprocally movable in a longitudinal direction along the base frame, said support assembly being connected to the base frame for supporting at least a portion of said extendable frame and comprising:

a pair of spaced apart lever devices pivotally mounted on the base frame for pivoting, in response to applied stresses, about substantially aligned primary pivot axes that are substantially transverse to the longitudinal axes of the base frame and the extendable frame;

two spaced apart support rollers rotatably connected to and extending between said lever devices, said support rollers having rotational axes that are located on opposite sides of said primary pivot axes, said support rollers extending across at least a portion of the base frame in engagement with the extendable frame such that the extendable frame rolls along said support rollers when the extendable frame is moved along the base frame wherein said lever devices pivot about said primary pivot axes in response to stresses applied by said support rollers.

6. A support assembly according to claim 5 wherein each lever device includes:

a pivot plate device pivotally mounted on the base frame for pivoting about the primary pivot axis of the lever device; and first and second bearing plates pivotally mounted on said pivot plate device for pivoting, in response to applied stresses, about a first pivot axis and a second pivot axis respectively, said first pivot axis and said second pivot axis being located on opposite sides of said primary pivot axis, one of said support rollers being rotatably connected between said first bearing plates of the lever devices and the other of said support rollers being rotatably connected between said second bearing plates of the lever devices.

7. A support assembly according to claim 6 including a further support roller mounted to and between said first bearing plates in engagement with the extendable frame for rotation about a rotational axis such that the extendable frame also rolls along said further support roller when the extendable frame is moved along the base frame, the rotational axes of the two support rollers mounted between said first bearing plates being located on opposite sides of said first pivot axis.

8. A support assembly according to claim 7 including an additional support roller mounted to and between said second bearing plates in engagement with the extendable frame for rotation about a rotational axis such that the extendable frame also rolls along said additional support roller when the extendable frame is moved along the base frame, the rotational axes of the two support rollers mounted between said second bearing plates being located on opposite sides of said second pivot axis.

9. A support assembly for a telescopic frame having an elongate base frame and an elongate extendable frame telescopically mounted to said base frame, comprising:

a pair of spaced apart pivot plate devices each pivotably connected to an opposite side of said base frame for pivoting about a common primary pivot axis, each of said pivot plate devices having first and second bearing plates pivotally mounted thereto for pivoting about a first pivot axis and a second pivot axis respectively, said first and second pivot axes being located on opposite sides of said primary pivot axis such that each said pivot plate device functions as a first class lever responsive to forces applied on said pivot plate device by said bearing plates; and at least two support rollers extending between and rotatably mounted to the first bearing plates for rotation about axes that are located on opposite sides of said first pivot axis such that said first bearing plates function as first class levers responsive to forces applied thereon by the two support rollers; and at least one further support roller extending between and rotatably mounted to the second bearing plates of said pivot plate devices, said support rollers engaging the extendable frame such that the extendable frame rolls along said support rollers when the extendable frame is moved relative to said base frame.

10. A support assembly according to claim 9 including an additional support roller extending between and rotatably mounted to the second bearing plates of said pivot plate devices and engaging said extendable frame, said further support roller and said additional support roller having rotational axes located on opposite sides of said second pivot axis such that said second bearing plates function as first class levers responsive to forces applied thereon by said further and additional rollers.

* * * * *